Aug. 3, 1965  L. P. PUECHBERTY  3,198,352
PARCEL SORTING MACHINE
Filed Aug. 24, 1964  11 Sheets-Sheet 1

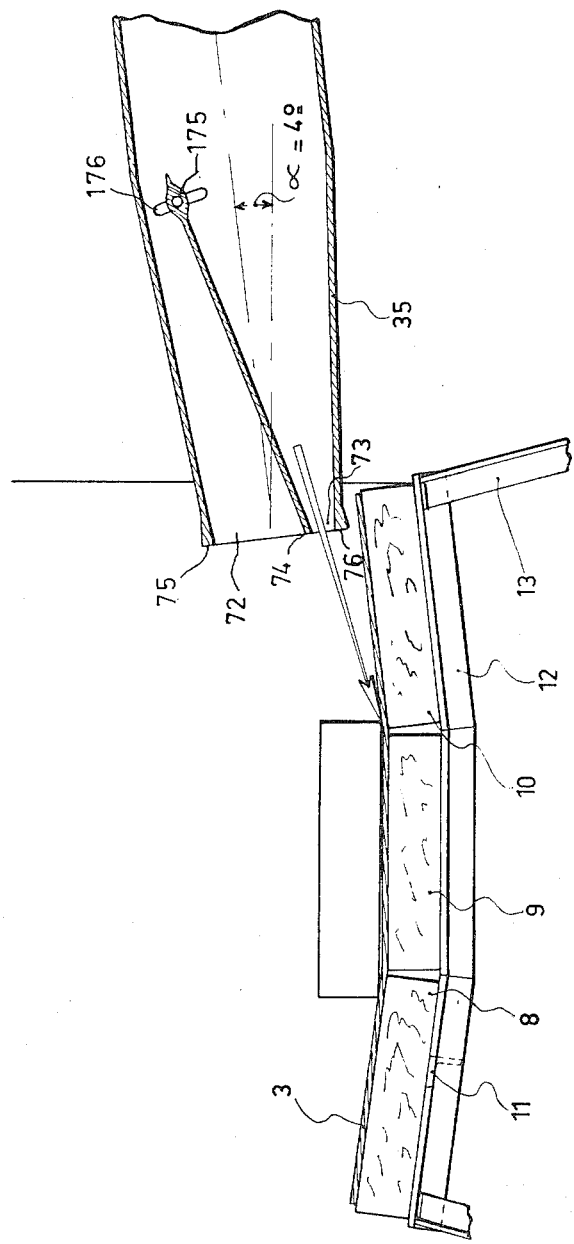

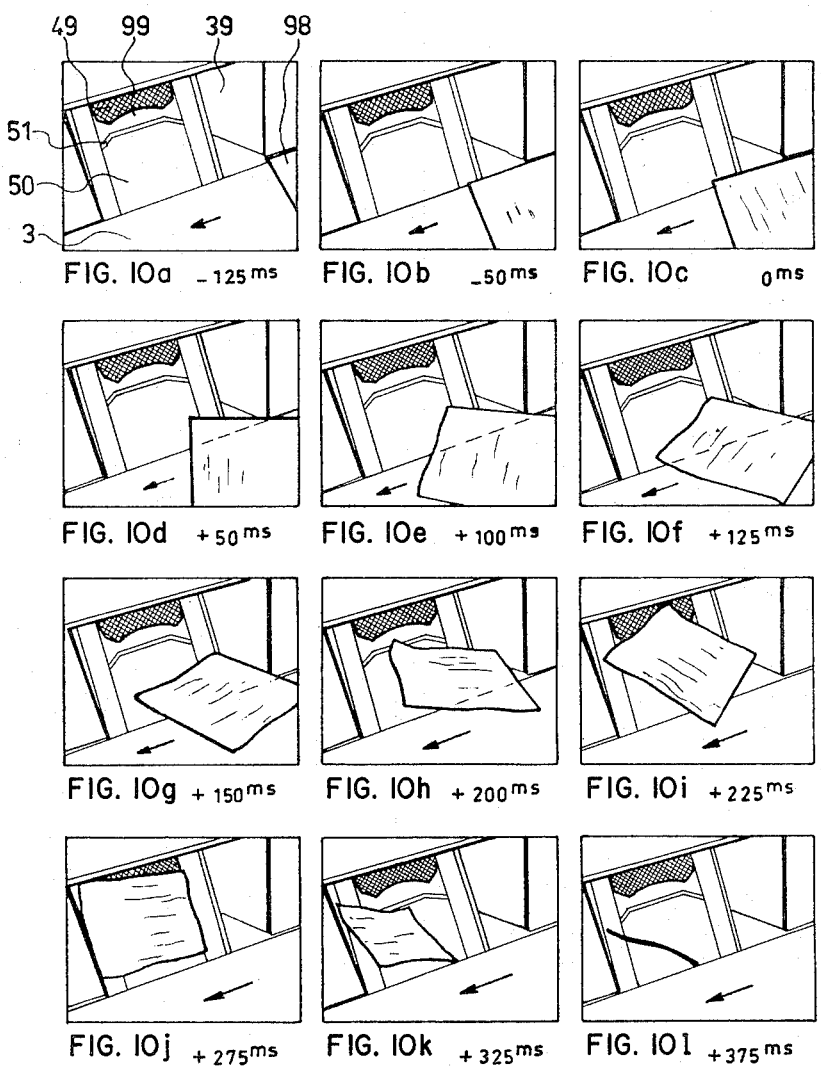

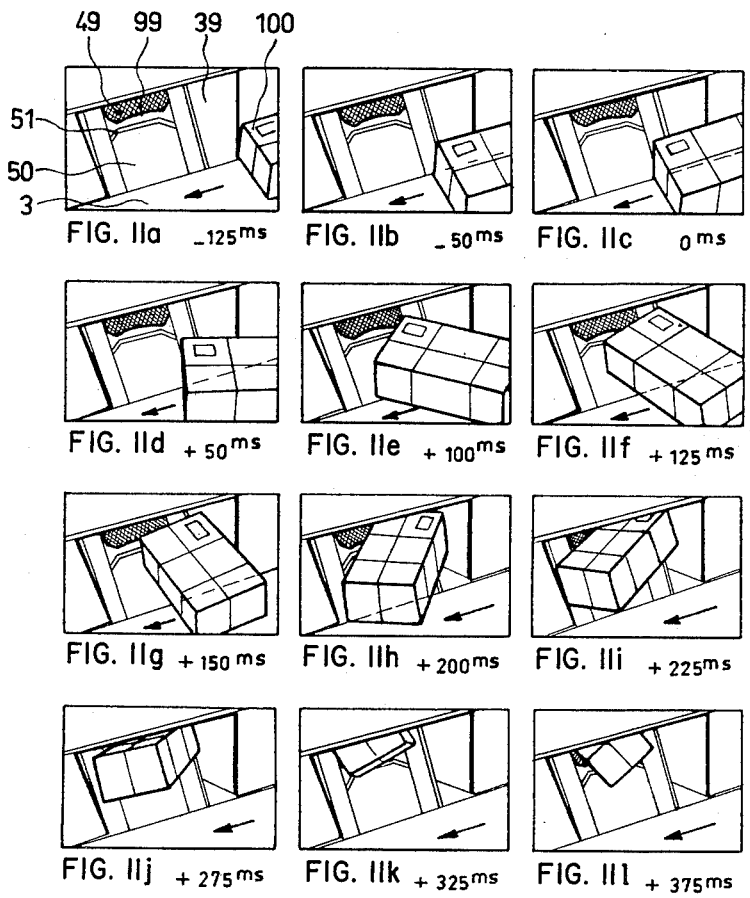

United States Patent Office 3,198,352
Patented Aug. 3, 1965

3,198,352
PARCEL SORTING MACHINE
Lucien P. Puechberty, Paris, France, assignor to Saunier-Duval, Paris, France, a company of France
Filed Aug. 24, 1964, Ser. No. 391,499
8 Claims. (Cl. 214—11)

The present invention is a continuation-in-part of my copending application Ser. No. 733,147 filed May 5, 1958 now abandoned.

The present invention relates to a machine for sorting parcels of the type handled by postal services, and in particular to a machine for selectively effecting the automatic air-blast ejection, at different predetermined positions, of parcels carried by a conveyor belt.

The weight and size of the parcels or articles handled by the postal services vary within wide limits according to the regulations enforced by the said postal services in various countries. In order to give a concrete example and without assigning an absolute value to the limits indicated, the machine upon which the invention is based is capable of sorting parcels weighing between 100 grammes and 20 kilogrammes and having a minimum dimension of several millimetres (flat parcels) and a maximum dimension exceeding the width of the chute into which the ejection air blast must propel them.

In previous types of sorting machine the ejector devices for selectively ejecting at a number of unloading positions parcels differing from one another in size and weight have generally been pusher plates controlled either mechanically, electrically or pneumatically. Air-blast ejectors have not been used because of difficulties in controlling an air jet which must be capable of propelling a parcel of any weight and shape in an accurately determined direction. Air jets directed at parcels of various shapes placed on a conveyor belt generally lead to the formation of whirls so that, unless special precautions are taken, the direction of thrust, which depends both on the friction between the parcel and the belt (and hence on the position of the centre of gravity) and on the resultant of the air jet on the parcel (and hence on the position of the centre of thrust), cannot be adequately controlled by the air jet and, as a consequence, the parcel does not enter the correct chute or alternatively, the chute has to be made unnecessarily widemouthed since it must accept parcels from any possible random direction produced by the air-blast.

An object of the present invention is the provision of a control system which ensures that the parcels will automatically be ejected from the conveyor belt by air-blast nozzle ejectors at the correct respective unloading positions as preselected by signals produced at the loading position where they are placed on the belt.

Another object of the invention is to provide an air-blast nozzle ejector device which allows the parcels first to be lifted up from the belt in order to eliminate friction and then propelled into the chutes by air-blast.

Another object of the invention is to provide an air-blast nozzle ejector device which allows lengthy parcels placed longitudinally on the conveyor belt to turn sideways and enter the chutes headlong, thus permitting the width of the chute mouth to be less than the maximum length of the parcels.

Another object of the invention is to provide an air-blast nozzle ejector device operating at each chute on the sorting machine and comprising a number of nozzles, the actual number of nozzles actuated for ejecting a given parcel depending on the weight and length of the same.

Another object of the invention is to provide an air-blast nozzle ejector device operating at each chute on the machine and comprising a number of nozzles having a delayed action with respect to one another and equipped with means of signal storage representing (i) an analogue of the length of the belt between the starting position of the parcels and the position of a particular nozzle in the device and (ii) an analogue of the length of the belt between the said particular nozzle and the other nozzles in the device so that the operation of the nozzles used to eject any parcel is correctly phased.

Another object of the invention is to provide means of controlling the number of nozzles in the device which take part in the ejection of a parcel in relation to its weight.

According to the principal feature of the invention, the air-blast nozzles blow in a direction slightly inclined towards the conveyor belt (the inclination to the horizontal being between 3° and 6°), while the air velocity across the mouth of the nozzle shows a gradient rising from the upper side to the lower side adjacent to the belt, in order to give a wedge-shaped jet velocity pattern so that the jet tends to force itself beneath the parcel and lift it from the belt.

The aforesaid and other objects and advantages will be apparent from the following detailed description of an illustrative embodiment of the invention, taken in conjunction with the accompanying drawings, of which:

FIG. 2 shows the sorting machine's conveyor belt in cross-section, together with one of the air jets;

FIGS. 10a to 10l inclusive and 11a to 11l inclusive are sketches showing frames in a film of the ejection of a parcel into a chute, referring respectively to a very flat parcel and to a long one.

Figure 1:
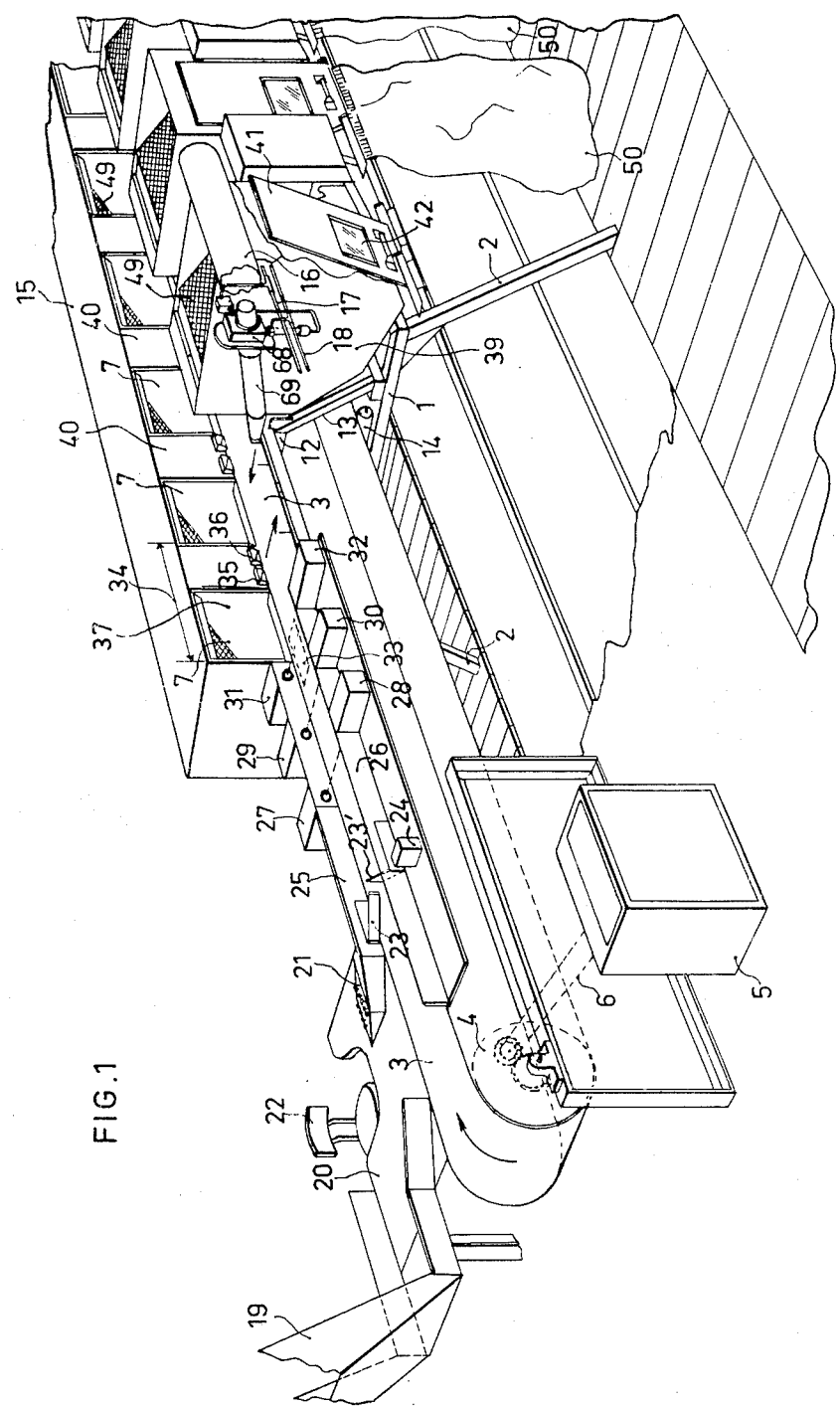
FIG. 1 is a general perspective view of the parcel-sorting machine according to the invention.

Referring first to FIG. 1, which shows the sorting machine with certain parts removed to reveal others which would otherwise be hidden, the machine is seen to consist of a frame 1 with legs 2 and a conveyor belt 3 which passes over drums at each end of the machine, only one drum 4 being visible in FIG. 1. The drum not seen in FIG. 1 is the one which drives the belt. Drum 4 is the tensioning and return drum, and its shaft is connected to a memory device 5 by a driving chain 6.

Chutes 7 are arranged along each side of the conveyor belt.

Conveyor belt 3 is made from polyamide 11, known commercially as Rilsan. In this case its width is 550 mms. and its speed between 0.50 m. and 1 m. per second. The coefficient of friction of normal-type postal parcels (cardboard or other packing materials wrapped in paper) lies between 0.1 and 0.15. To prevent round-shaped parcels from rolling across the conveyor belt and accidentally entering a chute for which they are not intended, the belt is slightly concave as seen from above, as is well shown in FIG. 2. This concavity is obtained by supporting the working length of the belt on a longitudinal floor consisting of longitudinal wooden bars 8, 9 and 10, the central bar 9 being horizontal and the two bars 8 and 10 sloping slightly towards the floor axis.

These floor bars rest on the flange of an angle bar 12 placed between two uprights 13 fixed to the frame. For the floor bars a wood which will not warp with heat or humidity should be selected; for example, nyankom wood may be used.

The outer edges of the belt are some 10 mms. higher than the centre axis, which, with a half-width of 275 mms., corresponds to an angle of about 2°. The return length of conveyor belt 3 rests on rollers 14.

Chutes 7 are arranged along each side of the belt, a certain space or pitch 34 being left between them. Each space between adjacent chutes contains two air jets 35 and 36. Jet 35 is the normal air-blast jet, whilst jet 36 is the make-up jet. The ends of the jets project a little over the edge of the conveyor belt (20 mms. in a machine built by the applicant). The lines of jets on each side of the conveyor belt are longitudinally out of phase, so that the jets on one side are opposite the opening of a chute on the other. The top of the chutes is normally covered by a cover 15, which has been removed from four chutes in the right-hand line (in the direction of movement of the parcels) in order to reveal the net inside the chute which absorbs the impact of the parcels entering it, and also the compressed air lines used for the operation of the jets. In FIG. 1 part of a low-pressure airline 16 can be seen, which serves for moving the parcels, together with parts of two high-pressure airlines 17 and 18, which serve for controlling the air-blast electric valves.

At the head of the machine is a feed chute 19 for bringing parcels to the machine, an operator's table 20 and a control keyset 21. The operator sits on chair 22 and takes the parcels from the bottom of chute 19, depressing on keyset 21 the code corresponding to the address on the parcel, which is placed on conveyor belt 3. Two cyclically-opening, starting half-gates 23 and 23' hold the parcels back until they can be released at recurrent intervals having the same period as the cycles of memory device 5, with which they are to a certain degree out of phase. The mechanism for opening one of the half-gates 23' is shown at 24.

Before passing between the two lines of chutes 7, conveyor belt 3 runs between two walls 25 and 26. In this part of its path, the belt crosses three photoelectric barriers consisting of projector lamps 27, 29 and 31 and photoelectric cells 28, 30 and 32.

As will be explained in detail below, photoelectric barrier 29–30 sets off the beginning of the cycle of memory device 5. Photoelectric barriers 27–28 and 31–32, which lie on each side of barrier 29–30, are intended to detect whether the parcel on the conveyor belt is short or long. The two barriers are broken simultaneously if the parcel is long, whereas this does not occur simultaneously with a short parcel. These two photoelectric barriers form the parcel-length detector which sets off the air-blast in make-up jet 36 (the further of a pair of jets in the direction of movement of the parcels). The distance between barriers 27–28 and 31–32 defines the predetermined length separating short parcels from long. The distance between barriers 29–30 and 31–32 defines the interval of time between the setting-off of the normal air-blast jet and the make-up jet for long or weighty parcels; this distance is substantially equal to the distance between the two jets in one pair (for draughting reasons this equality has not been observed in FIG. 1).

A balance 33 consisting, for example, of a length of conveyor belt 3 not supported by floor 8–9–10 and of a flexible bar making contact with a rigid bar is arranged on the belt at approximately the same point as photoelectric barrier 31–32. Contact 34 (FIG. 9) between these two bars forms the parcel-weight detector which sets off the air-blast in make-up jet 36.

Figure 3A:
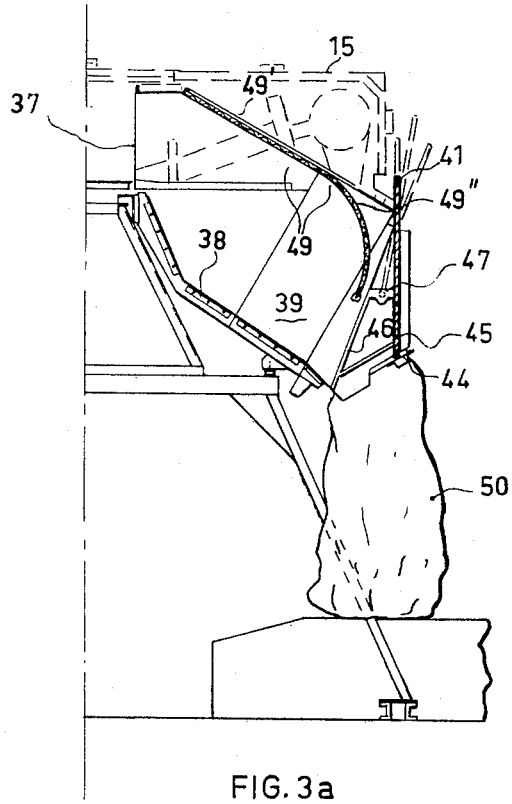
FIGS. 3a, 3b and 3c are respectively a general view in section and detail views of a chute into which the parcels are ejected by air-blast.
Figure 3C:
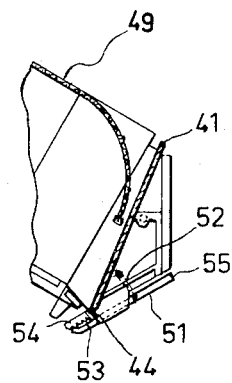
Figure 3B:
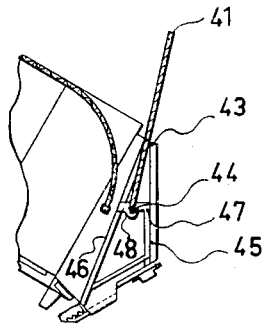

FIG. 1 shows a chute in general appearance, and details are shown in FIGS 3a, 3b and 3c. The general shape is that of a parallelepipedic box, having an inclined bottom which forms a slideway and an open mouth 37 facing the conveyor belt. It consists principally of a slideway 38 and two sides 39, to which are attached panels 40 which protect the air-blast electric valves. The normal 35 and make-up 36 jets pass through panels 40. The bottom of the chute on the side opposite to the open mouth 37 is closed by door 41 fitted with inspection window 42. This door can rest on two stops 43 integral with the chute and carries on its lower part two horizontal studs 44, which can run in a guideway in chute sides 39. The guideway has three sections: one section 45 is slightly inclined from top to bottom opposite the machine, section 46 is inclined from top to bottom towards the interior of the machine and section 47 is roughly horizontal and joins sections 45 and 46, having a cut-out 48 in which studs 44 can stop. The door can assume three different positions: the first with studs 44 in slideway 45 (sack-filling position), the second with the studs in slideway 46 (chute-closed position) and the third with the studs in cut-out 48 of slideway 47 (position giving the operator access to the inside of the chute).

The upper part of the chute is formed by a net 49 which has an upper flat portion 49' through which the air-blast is extracted and a rear curved portion 49" which, in addition to allowing the air-blast to escape, serves to absorb the impact of the parcels entering.

In a machine constructed by the applicant, the mouths 37 of the chutes are 750 mms. wide.

A quick-action means of affixing sacks 50 to the rear opening of each chute is available. It consists of a channel-iron frame 51 pivoted on the chute body at 52. To the back of frame 51 are attached two teeth 53 which engage a rack 54. According to which tooth on rack 54 teeth 53 engage, the width of the frame becomes larger or smaller. The bead on the mouth of the sack is placed around frame 51, the front 55 of which is pulled away from the machine and downwards to engage each of the two teeth with one of those on the rack. The sack is thus put into the filling position. To remove it, front 55 is pulled away from the machine and upwards, then pushed back towards the machine.

Figure 4:
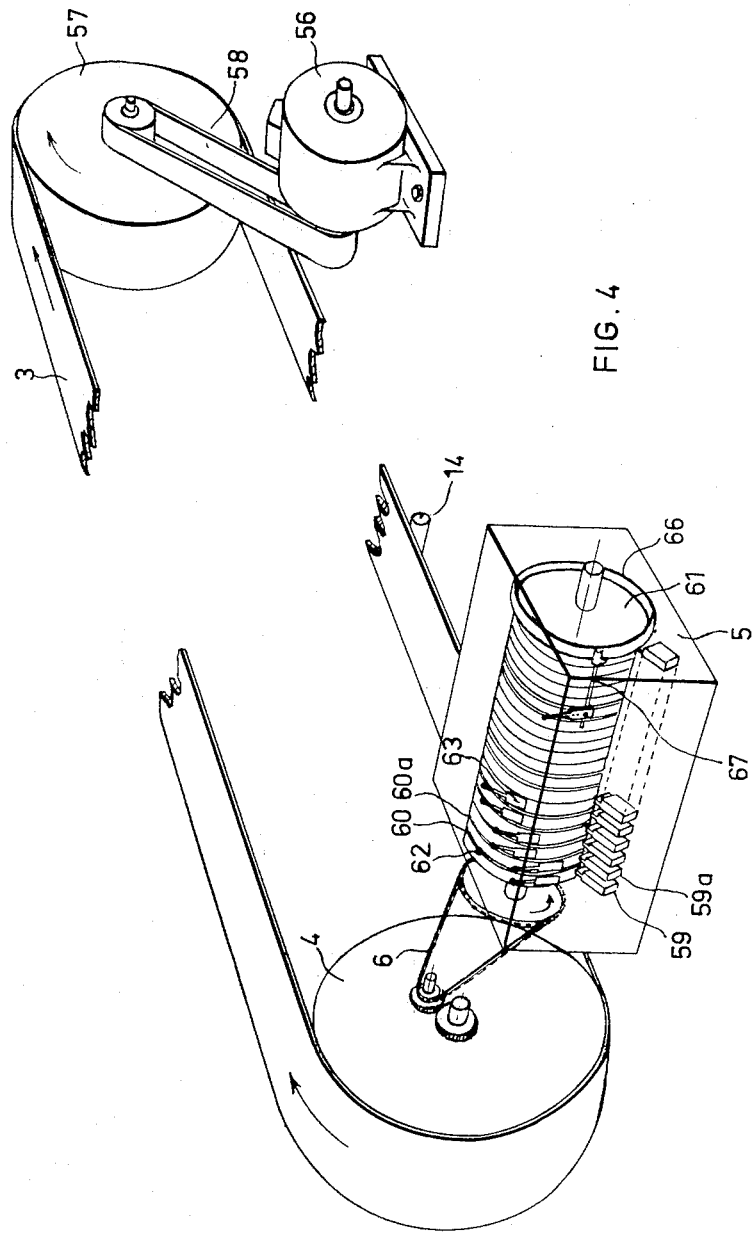
FIG. 4 shows the conveyor belt in perspective, together with the driving and return drums and the memory device.

FIG. 4 shows the motor 56 which drives drum 57 via belt 58. At the other end of the machine conveyor belt 3 passes over return drum 4, which drives memory device 5 via chain 6. Although the construction of the memory device is not a characteristic of the invention and it is sufficient if the memory works out the value of a time of travel quantified in relation to an address, it is preferable to use in the invention the ball memory described in U.S. patent application Ser. No. 127,540 filed July 28, 1961 in the name of Jean-Claude Charron and assigned to the same assignee as the present application. The memory comprises relay injectors 59 which inject metal balls 62 into the grooves 60 of a rubber-coated rotating drum 61, together with reading heads 63 comprising a contact between a fixed blade 64 and a moving blade 65 actuated by the passage of the ball below the reading head. Once it is inserted in a groove, the ball revolves with the drum and actuates the reading head relative to the said groove whenever it meets it. A signal is therefore obtained after a period which depends on the azimuth of the reading head.

A fixed plate 66 is mounted coaxially with drum 61 and on it may be fixed longitudinal reading head carrier arms 67 at a given azimuth. The reading heads may thus be positioned at predetermined azimuths. In order not to overload FIG. 4, only carrier arm 67, relative to a given azimuth, has been shown.

To each normal jet and each make-up jet there correspond a groove, 60 and 60a respectively, a ball injector, 59 and 59a respectively, and a read head, 63 and 63a respectively. Other details relative to the construction of this ball memory are given in the aforesaid U.S. patent application.

The normal 35 and make-up 36 jets are identical as far as the construction of the actual jet is concerned and also in regard to the electric control valve.

Figure 5:
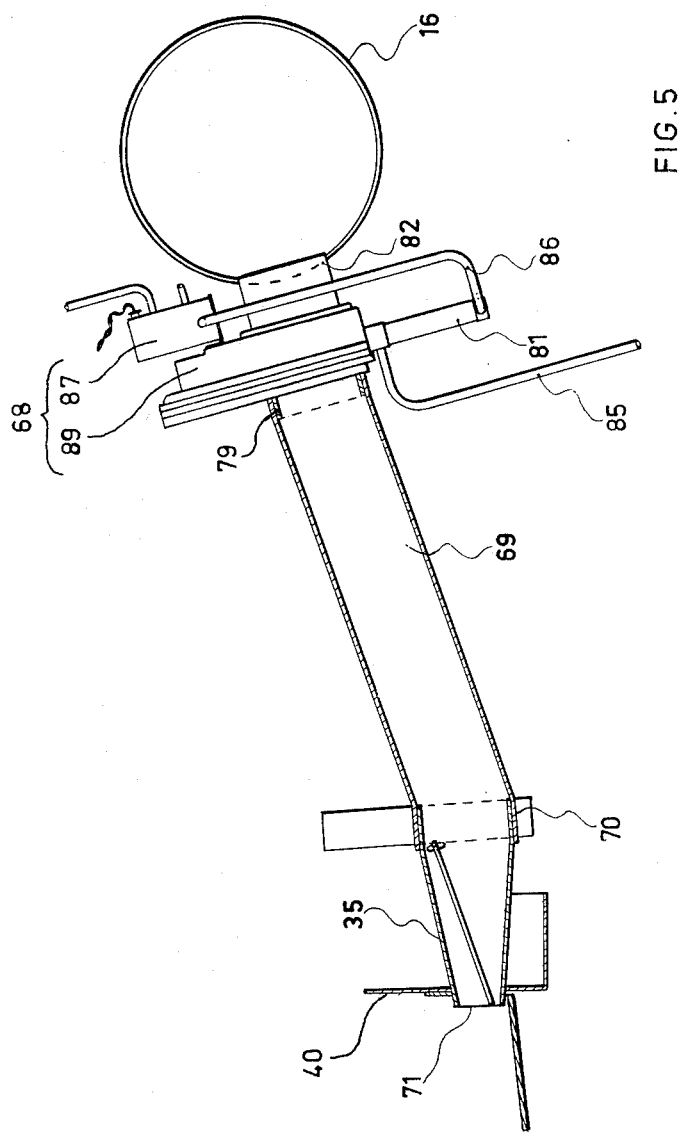
FIG. 5 shows the air-blast system.
Figure 6:
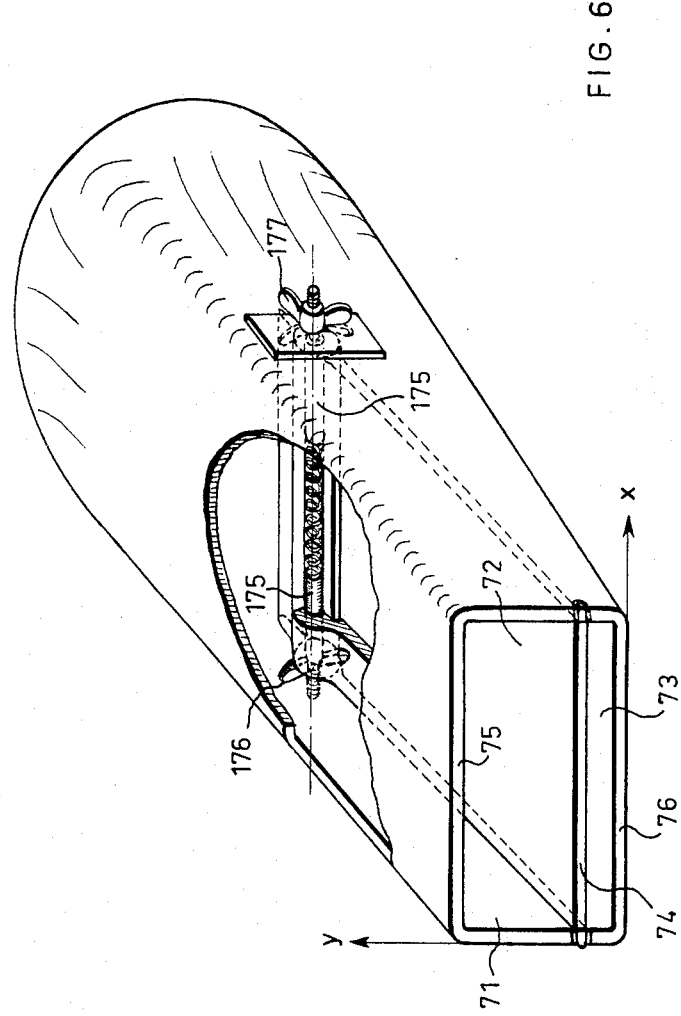
FIG. 6 shows an air jet in perspective, together with the means of adjusting the pressure distribution at the outlet.

A jet (FIG. 2, 5 and 6), 35 for example, is fed via a low-pressure airline 16 (at 70 grammes/cm.$^2$) and an electric valve denoted as a unit by the number 68, the air then passing through a flexible sleeve 69 which connects the electric valve to the jet proper.

The rear of the jet has a circular orifice 70 to fit flexible sleeve 69, whilst on the end facing the conveyor belt there is a rectangular working orifice 71. It thus comprises a conical portion and a pyramidal portion joined by a transition section. The jet axis is inclined to the horizontal at about 4°, this inclination being essential in order that the air-blast may move very flat parcels and lift heavy ones from the belt.

The surface of the working orifice of the jet is divided into at least two parts 72 and 73 by a partition 74.

The rear end of this partition comprises two extending lugs or bolts 175 which can be locked in lateral slots 176 by means of fly-nuts 177 in the pyramidal portion of the jet in any desired position allowing jets of air at different speeds to be applied to the two orifices 72 and 73. The position of partition 74 is so adjusted that the pattern of speeds at different points on the surface of mouth 71 has the form of a wedge-shaped volume which, starting from a forward line 77, exhibits one steeply sloping side ascending from the forward line to the upper horizontal side 75 of the mouth of the jet and another side gently sloping down from the forward line to the lower horizontal side 76 of the mouth.

Figure 8:
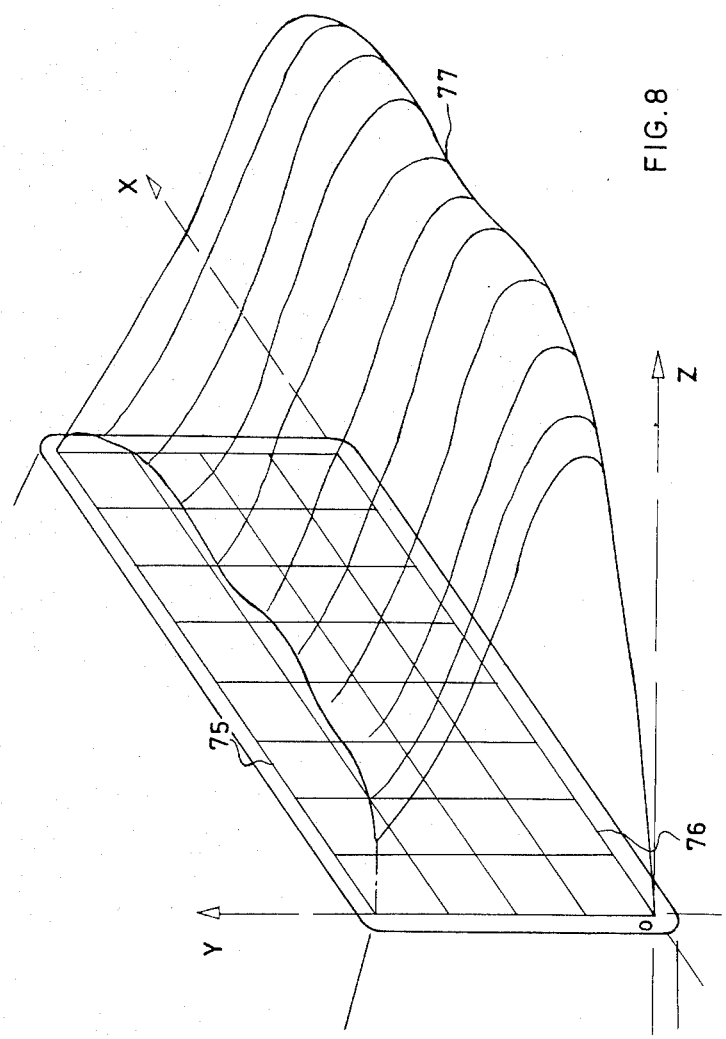
FIG. 8 is the speed distribution diagram of the air jet as it leaves the jet.

To trace the volume shown in FIG. 8, pick-ups measuring the speed of the air-stream issuing from the jet were placed in a plane parallel to the jet orifice 71, referring the plane of orifice 71 to axes Ox, Oy (FIG. 6) and the plane of the pick-ups to axes respectively parallel to these, namely $0x$, $0y$ (FIG. 8). The surface of orifice 71, which, in a machine constructed by the applicant, has an area of (4 x 8) cm.$^2$ was divided into thirty-two 1 cm.$^2$ squares and a length proportional to the speed of the component of the air-jet issuing from a square was marked perpendicular to the plane of the square, i.e. parallel to the direction Oz. FIG. 8 shows clearly the speed pattern which, in a right section parallel to the plane $yOz$, has a shape which is in general an unsymmetrical parabolic curve whose summit is below the plane parallel to $xOz$ and passing through the centres of the small sides of the jet orifice.

Figure 7:
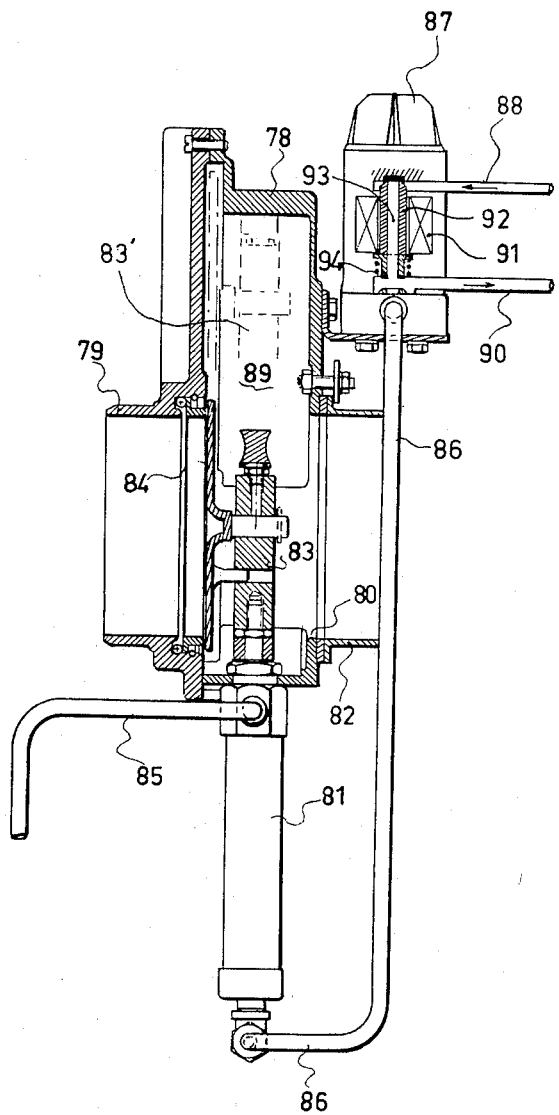
FIG. 7 shows the electric control valve for the air system.

The electric valve 68 (FIGS. 5 and 7) consists of an electric valve proper 87 and a cap valve 89, the latter comprising a box 78 having two openings 79 and 80 and extended by a cylinder 81. Flexible sleeve 69 fits on to opening 79 whilst opening 80 is connected to the low-pressure compressed air line 16 by joint 82. (For the make-up jet, which may very well be supplied at a different pressure, the connection may be to a special air-line instead of to airline 16 like the normal jet.) A piston moves in cylinder 81, its end 83 carrying a cap 84. When the piston is in its low position, cap 84 covers opening 79, and when it is in its high position 83' the opening is clear.

The piston is moved downwards by the application via airline 85 of compressed air at 2 kg./cm.$^2$. It is brought temporarily into its high position by compressed air at 5 kg./cm.$^2$ coming through airline 86. This high pressure air is supplied via the electric valve proper 87 which is of conventional design and connected to a feeder airline 88, an exhaust line 90 and a line 86 leading to the cap valve. It consists of a solenoid 91 and a plunger core 92 having an axial hole 93. The plunger is held outside the solenoid by spring 94, in which neutral position it connects airline 86 to exhaust line 90. When the solenoid is energised, the plunger is drawn into it, in which working position it connects airlines 86 and 88.

The air-blast impulse duration lies in the range of 300 milliseconds to 1 second and depends upon the velocity of the belt.

Figure 9:
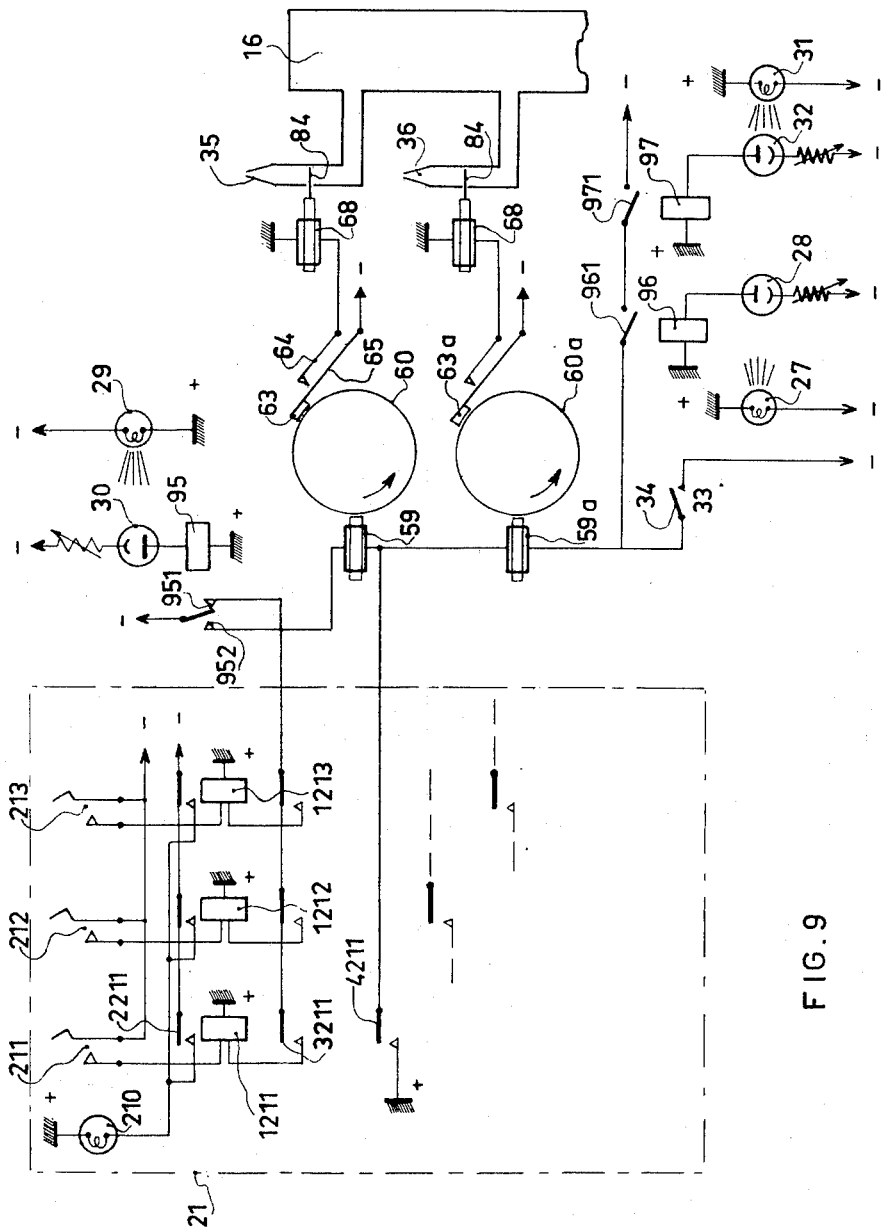
FIG. 9 shows the wiring diagram of the equipment for controlling the electric valves in the air system from the memory device.

Referring now to FIG. 9, which shows the equipment for controlling electric valves 68 from memory device 5, a normal jet 35 and an associated make-up jet 36 are again seen, together with the electric valves 68 and caps 84 associated with these jets, two grooves 60 and 60a in the memory device 5, injectors 59 and 59a and the reading heads 63 and 63a associated with these grooves, and projector lamps 27, 29 and 31 and photoelectric cells 28, 30 and 32 forming the three photoelectric barriers broken by the parcels moving on the conveyor belt.

211, 212 and 213 are three of the keys of coding keyset 21 and control the associated relays 1211, 1212 and 1213 respectively. Each relay is shown with three contacts 2211, 3211 and 4211 for relay 1211, the first controlling indicator lamp 210, the second controlling a holding circuit and the third preparing the energization of the circuit which controls ball injectors 59 and 59a in memory device 5. The number of active keys in keyset 21 is equal to half the number of grooves or injectors in the memory device.

The holding circuit of relays 1211–1213 passes through a contact 951 in relay 95 which is serially connected to photoelectric cell 30, this latter being illuminated except when a parcel breaks the rays of lamp 29. The control circuit for ball injector 59 passes through break contact 952 of relay 95. As a result, when a parcel crosses photoelectric barrier 29–30, ball injector 59 is actuated and relay 1211 drops back; there is, of course, an appropriate time-lag in the release of this relay in order to give the ball injector time to operate before it drops back.

As soon as ball injector 59 has operated, the ball which it has inserted into groove 60 revolves with drum 61. When this ball appears under reading head 63, whose azimuth round the axis of the drum has been suitably determined, the solenoid circuit 91 of electric valve 68 is energised and the electric valve relative to the normal jet operates.

The control circuit of ball injector 59a passes through contact 4211 and either through contact 34 of balance 33 or through series contacts 961 and 971 of the two relays 96 and 97 respectively in the feed circuits of photoelectric cells 28 and 32. Ball injector 59a is therefore actuated either when the parcel is heavy enough for balance 33 to close contact 34 or when the parcel is long enough for photoelectric cells 28 and 32 to be obscured simultaneously, letting relays 96 and 97 drop back together. The time-lag in the drop-back of 1211 (or similar relays) must, of course, be sufficient to ensure that contact 4211 does not open before contact 971 in the relay associated with the last photoelectric cell 32 encountered by the parcel has closed. If, due to the low speed of the conveyor belt, this time-lag were excessive, it would be sufficient to pass the holding circuit of relays 1211–1213 through a working contact in relay 97.

As soon as ball injector 59a has operated, the ball which it has inserted into groove 60a revolves with drum 61. When this ball appears under reading head 63a, electric valve 68 associated with jet 36 operates. If reading heads 63 and 63a are in the same azimuth in relation to drum 61, jets 35 and 36 will operate with an interval between them equal to the time required by the parcel to travel from photoelectric barrier 29–30 to photoelectric barrier 31–32. The distance between these two barriers is for preference equal to that between the two jets 35 and 36 in any pair of jets. This equality is not, however, indispensable, as the azimuthal position of the reading heads may be adjusted.

FIG. 10 shows twelve photographic frames numbered a to l, illustrating the ejection of a flat parcel 98 and its entry into chute 99. In the chute can be seen the side 39, the net 49 and the frame 51 for attaching the sacks; area 50 represents the inside of the sack attached at the chute outlet. Above each frame is written the instant in milliseconds at which it was taken. The ejection here uses only the normal jet. It can be seen in FIG. 10 that the air-blast starts at instant 0 ms.; at instant 50 ms. the parcel has lifted from the conveyor belt; at instants 100, 125, 150, 200 and 225 ms. the parcel turns and enters the chute without any of its surfaces in contact with the belt. At an instant between 275 and 325 ms., the air-blast has ceased and the parcel falls by gravity into sack 50.

FIG. 11 shows twelve photographic frames numbered *a* to *l*, illustrating the ejection of a long parcel 100 and its entry into chute 99. Reference numbers 39, 49 and 50 are the same as in FIG. 10 and the instant of taking in milliseconds is again shown above each frame. The ejection here uses both the normal and the make-up jets. At instant 0 ms., it can be seen that the air-blast starts; at instant 50 ms. the make-up jet comes into action; at instants 100, 125, 150, 200 and 225 ms. the parcel turns and enters the chute without any of its surfaces in contact with the belt. At an instant between 275 and 325 ms., the air-blast has ceased and the parcel, having been propelled into the net at instant 325 ms. and rebounded, falls by gravity into sack 50.

The weight or length required in a parcel to bring the make-up jet into action depends on a number of factors. In the machine built by the applicant, the make-up jet is used for sorting parcels between 5 and 20 kgs. and those between 500 and 1000 mms. long. More than one make-up jet could, of course, be used—two, for example. A skilled man will have no difficulty in making the changes in FIG. 9 which this entails.

Let us suppose that for parcels of 1 meter maximum length one jet up to 400 mms. is needed, two jets between 400 and 800 mms. and three jets between 800 and 1000 mms. Four photoelectric barriers will be placed on the conveyor belt path, one for starting and the three others—I, II and III—for length measurement. The distance between I and II will be 400 mms. and that between I and III 800 mms. The distance between the starting barrier and barrier II determines the time interval between the setting-off of the normal air-blast jet and the first make-up jet, and the distance between the starting barrier and barrier III determines the time interval between the setting-off of the normal jet and the second make-up jet.

Since the distance between barriers II and III is 400 mms., the distance between the starting barrier and barrier II must therefore determine that between the starting barrier and barrier III. This latter may not represent the most desirable interval for setting-off the air-blast through the second make-up jet. If this is so, barrier III may be replaced by two barriers III' and III'', the first used for length detection and the second for setting-off the air-blast.

Of the three jets, the first will be set off by the starting barrier, the second by barrier II and the third by barrier III'' given the condition that all three barriers I, II and III'' are broken simultaneously. Two jets will be set off, the first by the starting barrier and the second by barrier II, given the condition that barriers I and II are broken simultaneously while barrier III' is not broken. Only one jet will be set off by the starting barrier given the condition that barrier I is broken and barriers II and III' are not.

The make-up jets can, of course, be supplied with compressed air at different pressures and the speed gradient of the air across the mouth of each jet can be determined by means of a number of partitions.

What I claim is:

1. A parcel sorting machine for selectively ejecting at a plurality of unloading positions parcels according to the addresses thereof comprising an endless conveyor having a straight pass and conveying parcels thereon, a memory device adapted to temporarily store the parcel addresses, a first and a second pluralities of parcel-receiving devices respectively disposed along both sides of said pass to receive parcels therefrom, a plurality of air-blast nozzles along both sides of said pass, at least one nozzle being positioned between a contiguous pair of parcel-receiving devices, said nozzles having substantially vertical mouths whose lower parts are flush with said conveyor and being disposed to direct air toward a respective parcel-receiving device at the other side of said pass, a pressure air line, means for selectively feeding said nozzles from said pressure air line, said feeding means being controlled by said memory device according to the addresses stored therein and means for varying the velocity of the air-blast across the mouths of the nozzles, whereby the velocity pattern of the air-blast issued from the nozzles can be brought to a maximum at substantially the level of the conveyor.

2. The combination as defined by claim 1 in which said conveyor is concave upwardly to constrain parcels thereon.

3. The combination as defined by claim 1 in which said last-mentioned means comprises a movable partition positioned within each of said nozzles.

4. The combination as defined by claim 1 in which said parcel receiving devices each comprise a net for damping the parcel impact.

5. A parcel sorting machine for selectively ejecting at a plurality of unloading positions parcels according to the addresses thereof comprising an endless conveyor having a straight pass and conveying parcels thereon, a memory device adapted to temporarily store the parcel addresses, a first and a second pluralities of parcel-receiving devices respectively disposed along both sides of said pass to receive parcels therefrom, a plurality of air-blast nozzles along both sides of said pass, at least one nozzle being positioned between a contiguous pair of parcel-receiving devices, said nozzles having axes inclined toward the conveyor at an angle in the range from 3° to 6° and substantially vertical mouths whose lower parts are flush with said conveyor and being disposed to direct air toward a respective parcel-receiving device at the other side of said pass, a pressure air line, means for selectively feeding said nozzles from said pressure air line, said feeding means being controlled by said memory device according to the addresses stored therein, and means for varying the velocity of the air-blast across the mouths of the nozzles, whereby the velocity pattern of the air-blast issued from the nozzles can be brought to a maximum at the level of the conveyor.

6. A parcel sorting machine for selectively ejecting at a plurality of unloading positions parcels according to the addresses thereof comprising an endless conveyor having a straight pass and conveying parcels thereon, a memory device adapted to temporarily store the parcel addresses, a first and a second pluralities of parcel-receiving devices respectively disposed along both sides of said pass to receive parcels therefrom, a plurality of normal air-blast nozzles and a plurality of make-up air-blast nozzles along both sides of said pass, at least one normal nozzle and one make-up nozzle being positioned between a contiguous pair of parcel-receiving devices, said normal and make-up nozzles having substantially vertical mouths whose lower parts are flush with said conveyor and being disposed to direct air toward a respective parcel-receiving device at the other side of said pass, a pressure air line, means for selectively feeding said normal nozzles from said pressure air line, said feeding means being controlled by said memory device according to the adresses stored therein, means for measuring the length of the parcels and comparing it to a standard length and producing a signal when the parcel length exceeds the standard length, means for selectively feeding said make-up nozzles from said pressure air line, said last feeding means being controlled by said signal and means for varying the velocity of the air-blast across the mouths of the normal and make-up nozzles, whereby the velocity pattern of the air-blast issued from the normal and make-up nozzles can be brought to a maximum at the level of the conveyor.

7. A parcel sorting machine for selectively ejecting at a plurality of unloading positions parcels according to the adresses thereof comprising an endless conveyor having a straight pass and conveying parcels thereon, a memory device adapted to temporarily store the parcel addresses a first and a second pluralities of parcel-receiving devices respectively disposed along the sides of said pass to receive parcels therefrom, a plurality of normal air-blast nozzles and a plurality of make-up air-blast nozzles along both sides of said pass, at least one normal nozzle and one make-up nozzle being positioned between a contiguous pair of parcel-receiving devices said nozzles having substantially vertical mouths whose lower parts are flush with said conveyor and being disposed to direct air toward a respective parcel-receiving device at the other side of said pass, a pressure air line, means for selectively feeding said normal nozzles from said pressure air line, said feeding means being controlled by said memory device according to the addresses stored therein, means for measuring the weight of the parcels and comparing it to a standard weight and producing a signal when the parcel weight exceeds the standard weight, means for selectively feeding said make-up nozzles from said pressure air line, said last feeding means being controlled by said signal and means for varying the velocity of the air-blast across the mouths of the normal and make-up nozzles, whereby the velocity pattern of the air-blast issued from the normal and make-up nozzles can be brought to a maximum at the level of the conveyor.

8. A parcel sorting machine for selectively ejecting at a plurality of unloading positions parcels according to the addresses thereof comprising an endless conveyor having a straight pass and conveying thereon, a memory device adapted to temporarily store the parcel addresses, a first and a second pluralities of parcel-receiving devices respectively disposed along both sides of said pass to receive parcels therefrom, a plurality of normal air-blast nozzles and a plurality of make-up air-blast nozzles along both sides of said pass, at least one normal nozzle and one make-up nozzle being positioned between a contiguous pair of parcel-receiving devices, said normal and make-up nozzles having substantially vertical mouths whose lower parts are flush with said conveyor and being disposed to direct air toward a respective parcel-receiving device at the other side of said pass, a pressure air-line, means for selectively feeding said normal nozzles from said pressure air-line, said feeding means being controlled by said memory device according to the addresses stored therein, means for measuring the length of the parcels and comparing it to a standard length and producing a first signal when the parcel length exceeds the standard length, means for meausring the weight of the parcels and comparing it to a standard weight and producing a second signal when the parcel weight exceeds the standard weight, means for selectively feeding said make-up nozzles from said pressure air-line, said last feeding means being controlled by said first and second signals and means for varying the velocity of the air-blast across the mouths of the normal and make-up nozzles, whereby the velocity pattern of the air-blast issued from the normal and make-up nozzles can be brought to a maximum at the level of the conveyor.

References Cited by the Examiner
FOREIGN PATENTS 1,174,570  3/59  France.

SAMUEL F. COLEMAN, *Primary Examiner.*